US006931547B2

(12) United States Patent
Quan

(10) Patent No.: US 6,931,547 B2
(45) Date of Patent: Aug. 16, 2005

(54) METHOD AND APPARATUS FOR IDENTIFYING A VERTICAL BLANKING INTERVAL IN A TELEVISION SIGNAL

(75) Inventor: Ronald Quan, Cupertino, CA (US)

(73) Assignee: Macrovision Corporation, Santa Clara, CA (US)

( * ) Notice: Subject to any disclaimer, the term of this patent is extended or adjusted under 35 U.S.C. 154(b) by 926 days.

(21) Appl. No.: 09/754,698

(22) Filed: Jan. 3, 2001

(65) Prior Publication Data

US 2002/0085717 A1 Jul. 4, 2002

(51) Int. Cl.[7] .............................. H04L 9/00; H04N 5/91
(52) U.S. Cl. ....................................... 713/200; 386/94
(58) Field of Search .................. 713/200; 380/201–204, 380/206; 386/46, 94; 348/500–501, 571, 634

(56) References Cited

U.S. PATENT DOCUMENTS

| 3,963,865 A | | 6/1976 | Songer |
| 4,100,575 A | | 7/1978 | Morio |
| 4,631,603 A | | 12/1986 | Ryan |
| 4,803,552 A | | 2/1989 | Marin |
| 5,194,965 A | * | 3/1993 | Quan et al. ................... 386/94 |
| 5,822,425 A | * | 10/1998 | Ezaki et al. ................... 386/94 |

* cited by examiner

Primary Examiner—Hosuk Song
(74) Attorney, Agent, or Firm—Macrovision Corporation; James H. Salter; George B. Almeida

(57) ABSTRACT

Various techniques and associated embodiments are disclosed for providing defensive measures against "black boxes," wherein the techniques utilize unconventional schemes for detecting the vertical blanking interval (VBI) of a video signal containing a copy protection signal. The unconventional schemes would be of particular interest to the black boxes, which must locate the VBI to generate a vertical rate signal in order to perform the task of illegally removing the copy protection signal. The unconventional schemes utilize the particular characteristics or peculiarities of the video signals in the VBI to detect the VBI and generate therefrom a reliable vertical or frame rate signal. The characteristics include various pulse spacings and/or pulse widths which may occur in specific lines in the VBI, and which may be detected to allow deriving the reliable vertical or frame rate signal. Alternatively, techniques for modifying the characteristic signals of the VBI also are disclosed to prevent the derivation of a correct or reliable vertical or frame rate signal utilizing the unconventional schemes of detection of previous mention. In a third alternative, the reliable vertical rate or frame signal is utilized to attenuate, defeat or otherwise modify an anti-copy protection signal or a normal video signal.

52 Claims, 9 Drawing Sheets

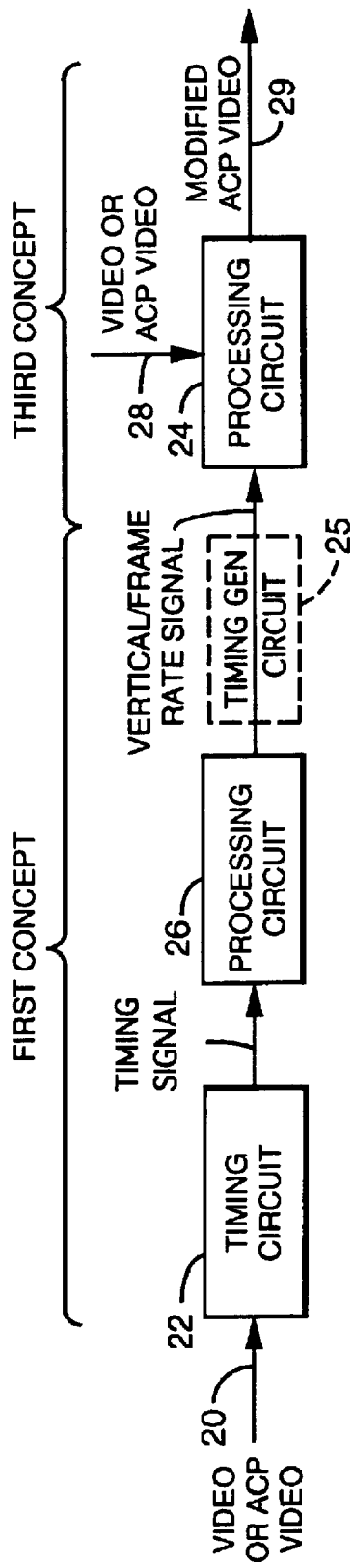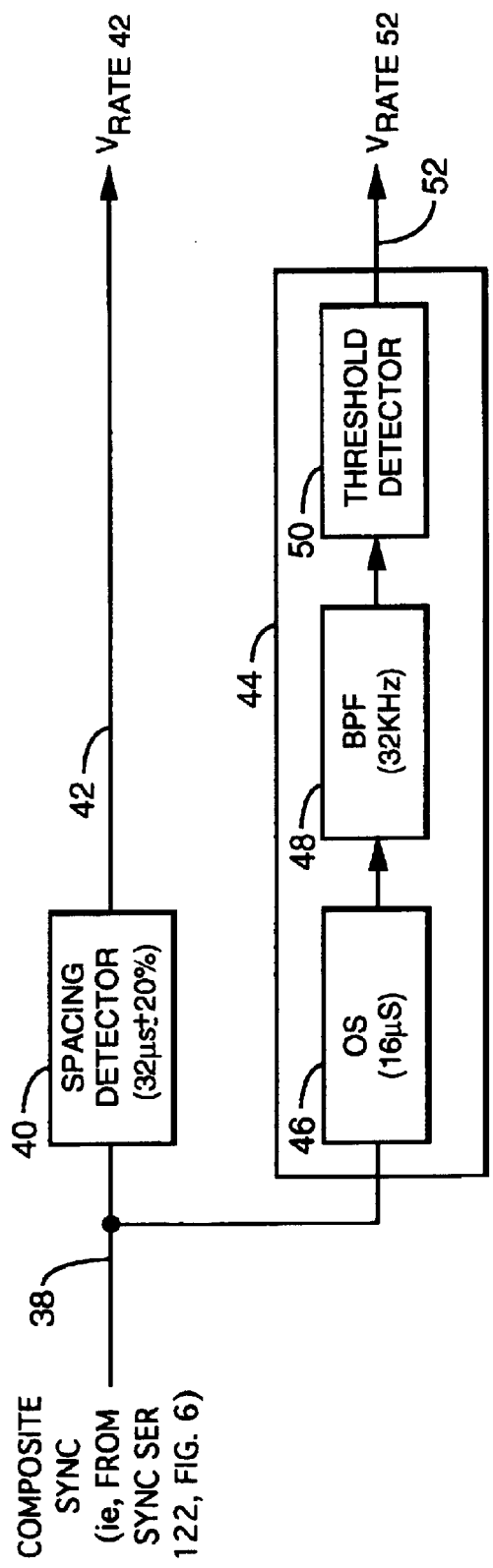

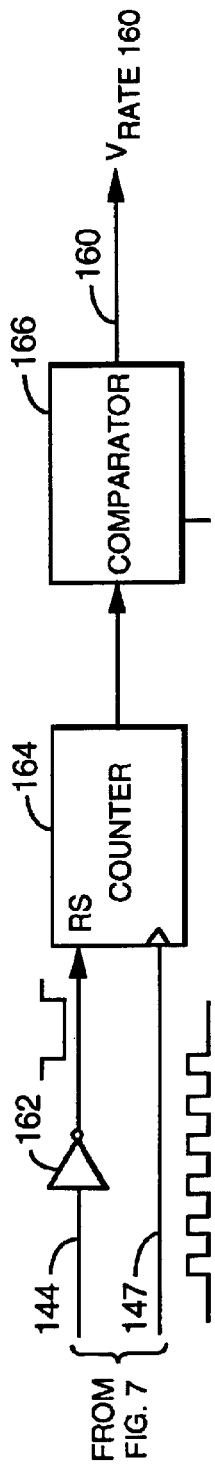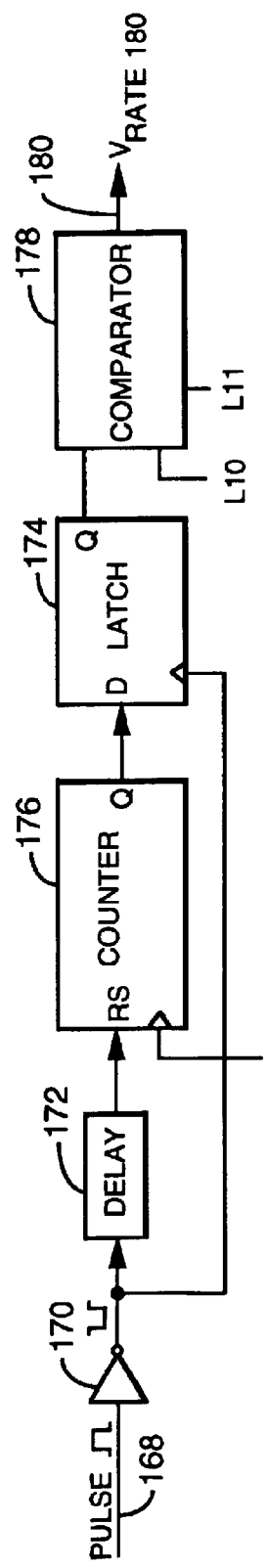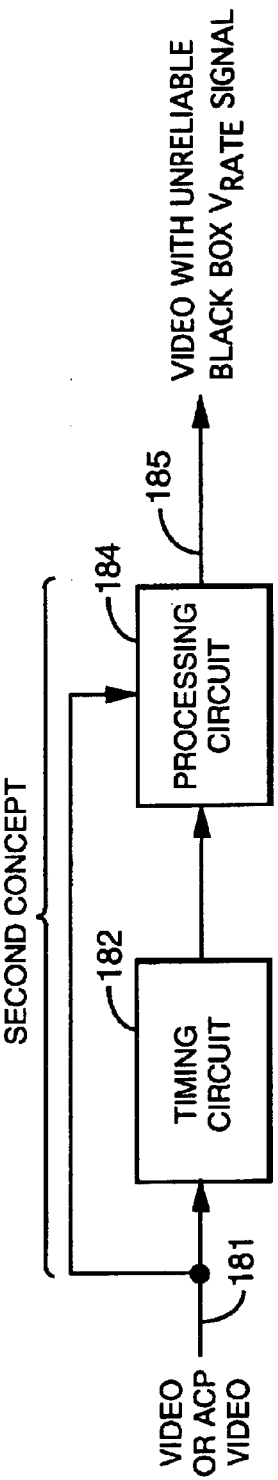

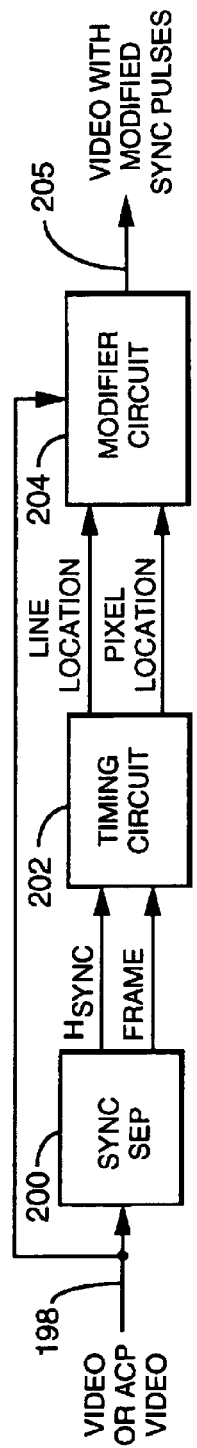
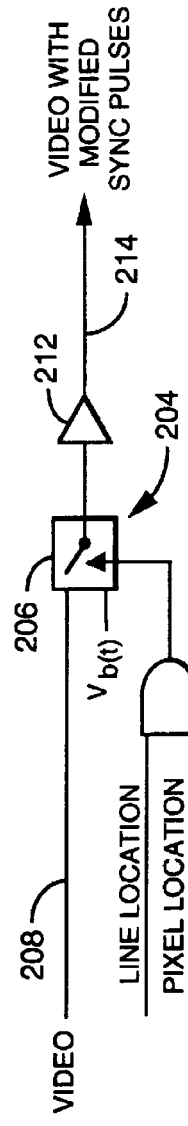
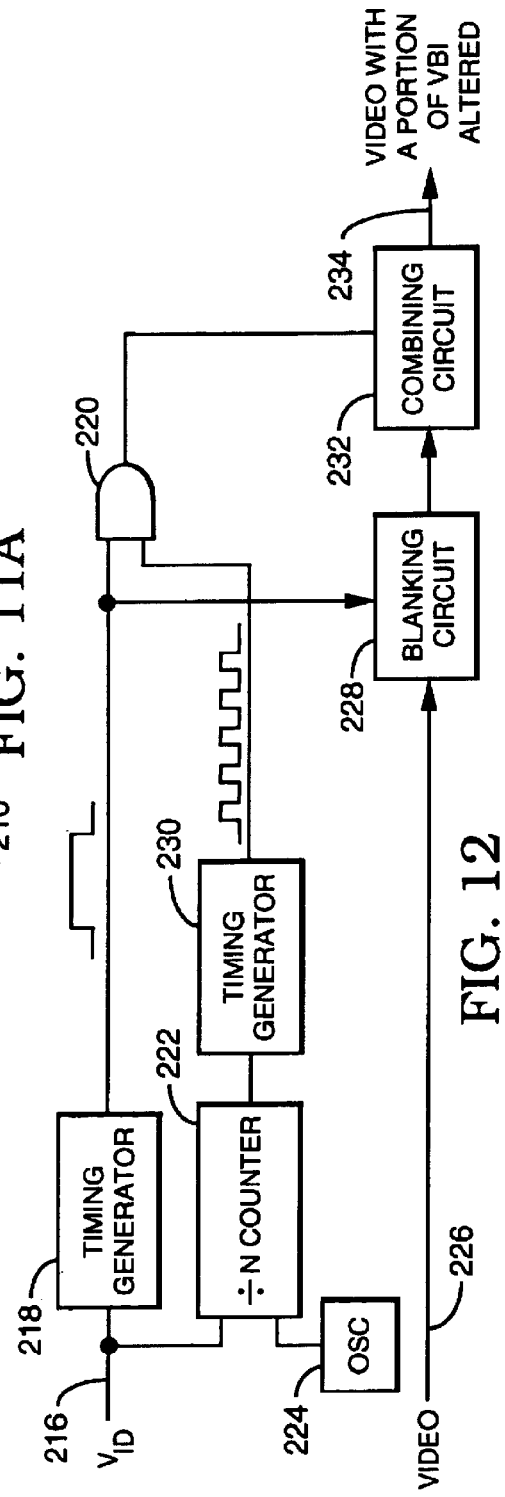
FIG. 11
FIG. 11A
FIG. 12

METHOD AND APPARATUS FOR IDENTIFYING A VERTICAL BLANKING INTERVAL IN A TELEVISION SIGNAL

BACKGROUND OF THE INVENTION

The present invention relates to television (TV) anti-copy protection (ACP) processes as well as to processes for defeating or reducing the effects of copy protection signals and, more particularly, to various unconventional techniques for identifying the occurrence of the vertical blanking interval (VBI) in a television signal. This information is required in copy protection defeating processes which need to locate the VBI in order to remove any of the various types of copy protection signals that conventionally are inserted in various video lines in the VBI. The invention further relates to techniques for defeating the processes of identifying the VBI, that is, for preventing the identification of the VBI via the unconventional techniques disclosed herein.

In the television field, the development of copy protection processes for protecting television signals recorded on various recording mediums or transmitted over various transmission mediums, has resulted in the proliferation of schemes and devices for locating and then removing the copy protection signals from the TV signals in order to illegally copy the recorded or transmitted signal for profit. Typical of such devices for defeating copy protection processes are those known colloquially as "black boxes."

Various types of illegal black boxes are effective in neutralizing respective types of copy protection (or scrambled) signals such as those using for example, pseudo sync/AGC pulse manipulation, horizontal or vertical sync suppression and/or modulation, color burst manipulation, etc., techniques. In most such types of illegal black boxes it first is necessary to locate a reliable vertical sync or vertical rate signal. Once a reliable vertical related signal is established, circuits such as sync separators and low pass filters deliver timing signals which in turn enables the defeat of the copy protection signals and the generation of a viewable video signal. In a typical technique, circuits are used to identify the characteristically longer broad vertical sync pulses to generate a vertical (or frame) rate signal. In a further technique, black boxes utilize the color burst signal in the television signal to attain illegal decoding, wherein the lack of color burst in conventional lines of the VBI can be detected to thereby identify the VBI and enable the illegal generation of a reliable vertical rate signal.

In a still further type of black box technique, a computer is used to analyze a video signal to determine the location of the VBI and generation of a vertical related signal, thereby enabling the illegal decoding of the copy protection signal.

SUMMARY OF THE INVENTION

Accordingly, it would be highly desirable to explore all possible alternative unconventional techniques for identifying a VBI and thus for generating a reliable vertical and/or frame rate signal based on a video input signal such as, for example, standard, scrambled and copy protected video signals.

To this end, the present invention provides various embodiments of methods and apparatuses for identifying a VBI employing unconventional techniques based upon the peculiarities and specific characteristics of the video line waveforms within the vertical blanking interval (VBI). Included in the embodiments are those enumerated here by way of example only.

A first embodiment senses the time interval between certain horizontal sync edges. The time interval between normal horizontal sync pulses is 63.55 microseconds ($\mu$s). However, in the VBI, there are pulses spaced apart about half the normal interval, or about 32 $\mu$s. It follows that the 32 $\mu$s spacing can be considered an indication for identifying the VBI and for then generating a vertical rate pulse. A timing circuit may then be used to generate the vertical or frame rate pulse with the proper timing to modify the ACP or video signal.

Another embodiment senses a time interval of about 4.7 $\mu$s plus 2.3 $\mu$s, or about 7 $\mu$s. This time interval occurs in the VBI on lines six (6)–seven (7) and on line 269 in the NTSC color video standard and upon detection can be used as a VBI indicator.

A further embodiment comprises measuring the pulse widths of horizontal sync signals for those pulses that are less than the normal 4.7 $\mu$s, which narrow horizontal sync signals occur in the VBI and thus can be used as indicators of the VBI.

Another embodiment comprises generating a pulse greater than 4.7 $\mu$s but less than about 27 $\mu$s by triggering off the leading edge of the horizontal sync. This pulse then is used to gate out sync pulses. Signals such as the broad vertical pulses forming the vertical sync signal will output pulses, whereas horizontal sync signals and/or equalizing pulses will be gated out and will not output a pulse. This condition also provides an indication of the VBI.

A further embodiment comprises measuring the time interval between the trailing edges of two pulses and then searching for a period of about 56.5 $\mu$s which occurs once every field on video line 266 and lines three (3)–four (4) in the NTSC standard. Detection of the 56.5 $\mu$s time interval is used as an indication of the VBI.

A still further embodiment includes providing an "inept" or incorrectly operated (i.e., "incorrect" for simplicity) 2H eliminator circuit that triggers off the trailing edge (rather than the leading edge) of a horizontal sync pulse (Hsync), for a non-retriggerable duration of over a half of a line (½H) duration (i.e. about 45 $\mu$s). The time interval as measured at the output of the "incorrect" 2H eliminator circuit between most video lines will be 63.55 $\mu$s except on lines 266 and 3–4 (in the NTSC standard). The time interval between the leading edges of the H sync pulses on lines 3–4 will be about 88.3 $\mu$s and the interval between the trailing edges of the sync pulses on line 266 is 56.5 $\mu$s. This information can be used as an indication of the VBI presence, whereby a vertical rate signal may be produced.

Another embodiment comprises sensing the pseudo sync pulses of a corresponding anti-copy protection signal and measuring the time interval between these pulses, nominally less than 10 $\mu$s, to locate the VBI.

In an alternative portion of the invention, that is, where the VBI signals are modified to prevent the unconventional techniques from locating the VBI as disclosed above, further embodiments for preventing the identification of the VBI includes eliminating or modifying certain pulses such as eliminating the 2H (twice horizontal) pulses in at least a part of the vertical sync signal, or adding fake 2H pulses near the bottom of the active TV field, (etc). In addition, the elimination or addition of pulses may be modulated as, for example, by AM, position and/or pulse width modulation processes, to cause a black box to output a further degraded signal.

A third portion of the invention herein concerns the utilization of the reliable vertical rate signal produced by the first portion of the invention, which identifies the VBI by unconventional techniques, to modify or otherwise reduce the effects of an anti-copy protection signal.

BRIEF DESCRIPTION OF THE DRAWINGS

FIG. 2 is a block diagram illustrating a basic configuration of vertical rate signal regeneration circuitry for deriving a vertical rate signal via unconventional means in accordance with the first portion of the invention.

FIG. 3 is a block diagram illustrating embodiments of the invention which sense pulse intervals of about 32 microseconds ($\mu$s) to produce a reliable vertical rate signal.

FIG. 6A is a block diagram illustrating an adjunct embodiment of the invention useful for example with the circuit of FIG. 6 in given noisy signal conditions.

FIG. 7 is a block diagram illustrating another embodiment of the invention which measures pulse widths of positive going pulses.

FIG. 8 is a block diagram illustrating a basic configuration of vertical rate signal regeneration circuitry of the second portion of the invention, which is thus adapted for deriving an incorrect, i.e. unreliable, vertical rate signal; that is, for defeating or preventing the generation of a proper, i.e. reliable, vertical rate signal such as provided by the circuitry of FIG. 2, and FIGS. 3–7.

FIG. 11 is a block diagram illustrating another embodiment of the second portion of the invention which defeats or prevents the generation of a correct or reliable vertical rate signal.

FIG. 11A is a block diagram illustrating a further embodiment of the invention of FIG. 11, and depicting another circuit for inserting pulses or signals in the video signal to prevent generating a correct or reliable vertical rate signal.

FIG. 12 is a block diagram illustrating an embodiment of the previously mentioned third portion of the invention in which reliable vertical rate signals such as generated in FIGS. 3–7 are then used to modify a selected portion(s) of an anti-copy protection signal in the VBI.

DETAILED DESCRIPTION OF THE PREFERRED EMBODIMENTS

It is to be understood that the present invention contemplates three individual yet complementary portions or concepts.

First, the invention is concerned with a reliable vertical rate generation portion that derives a vertical rate signal utilizing unconventional techniques made possible by the particular characteristics and peculiarities of the VBI waveforms in conventional television signals.

Second, the invention is concerned with a portion that selectively modifies particular signals in the VBI of conventional television signals to prevent the derivation of a reliable vertical rate signal such as those using the unconventional techniques of the above first portion of the invention.

Third, the invention is concerned with a portion which utilizes the unconventionally derived, reliable vertical rate signal of the first portion of previous mention, to then selectively modify a television signal or copy protected television signal, to reduce the effects of the copy protection signals for VCR and/or TV sets.

Figure 1:
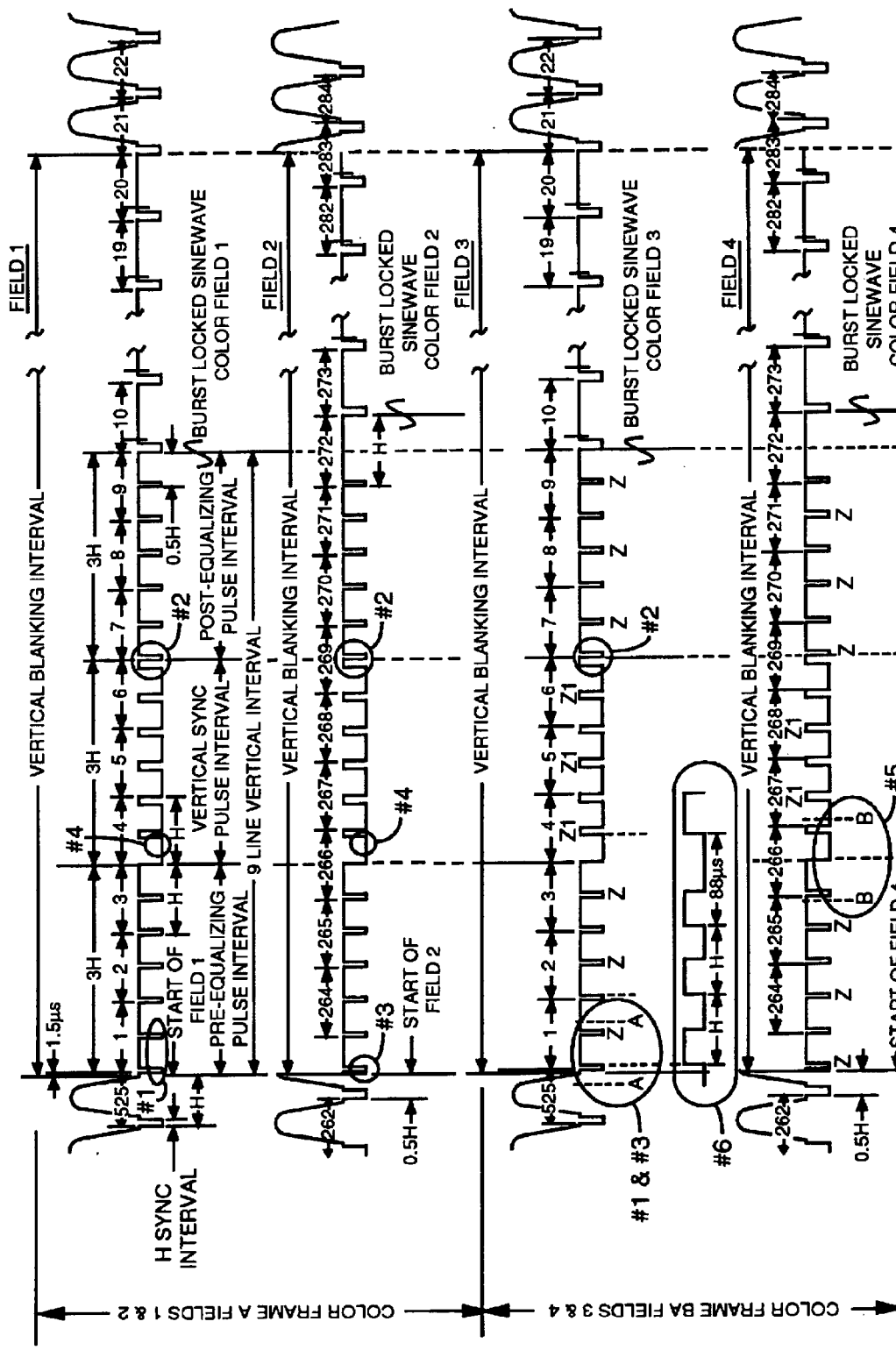
FIG. 1 is a partial diagram illustrating the waveforms of the signals in a conventional vertical blanking interval (VBI), for a NTSC color video standard, further illustrating the techniques of the various embodiments of previous mention and discussion below, for sensing and determining a vertical rate signal.

Considering the first portion of the invention, FIG. 1 illustrates diagrammatically several examples of pulse widths and/or pulse spacings in a conventional VBI of a NTSC color television standard, the dimensions and/or timing of which provide unconventional means for identifying the presence of the VBI. The specific examples of pulse widths and/or spacings are circled and numbered to facilitate their description in the following specification with respect to respective figures. It is to be understood that the techniques described in terms of the NTSC standard are equally applicable to the PAL, etc., standards.

Figure 1A:
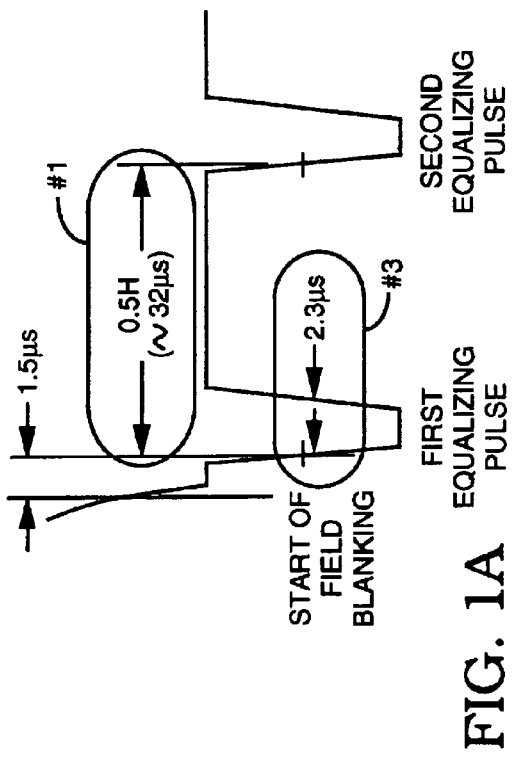
FIGS. 1A and 1B are enlarged views of portions of FIG. 1 showing in further detail pertinent portions of the waveforms.
Figure 1B:
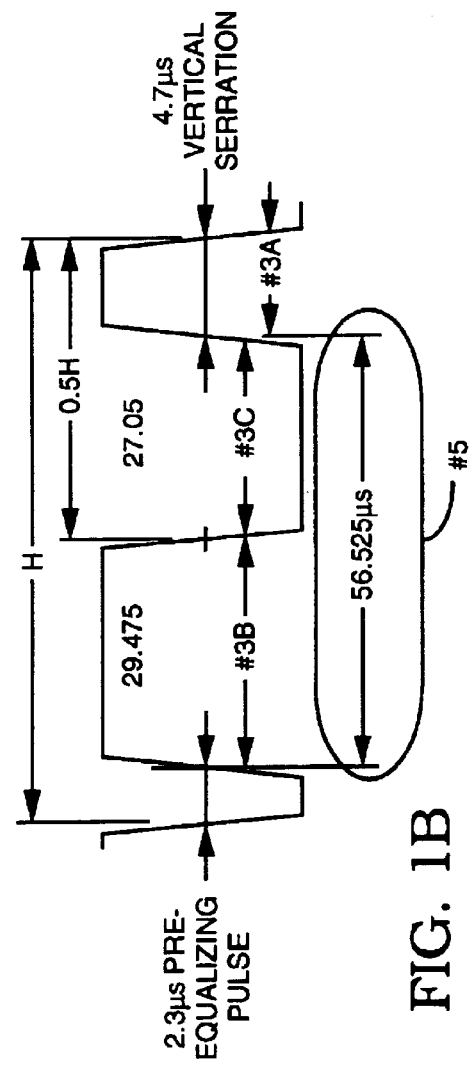

FIG. 1 is further described in FIGS. 1A and 1B which show in greater detail in broken-out sections, the examples of the invention numbered #5 and #1, #3, respectively. FIGS. 1A and 1B include legends describing in detail various pulse widths, spacings, etc., and thus are generally self explanatory taken in conjunction with FIG. 1.

FIG. 2 illustrates basic circuitry definitive of the first portion of previous mention of the invention, wherein a video signal, which can include a copy protection signal, is supplied via an input 20 to a timing circuit 22, as well as to a signal processing circuit 24. A timing signal indicative of the input sync signal is supplied by circuit 22 (which may include a sync separator) to another signal processing circuit 26. In accordance with the first portion of the invention, the processing circuit 26 includes circuit means for sensing selected pulse widths and/or pulse spacings peculiar to the VBI waveforms illustrated in FIG. 1. It follows that the output of circuit 26 is the desired reliable vertical rate signal. As depicted in phantom line, an optimal timing circuit 25 may be included to provide suitable timing for properly relocating a vertical or frame rate signal which then is used for modifying the video and/or ACP video signal, for example, in the VBI.

It is to be understood that although the embodiments of the invention are described herein as providing reliable vertical rate signals (in portion or concept 1) a reliable frame rate signal may be provided if desired, and a suitable vertical rate signal may be derived from a frame rate signal.

In accordance with the invention, the reliable vertical (or frame) rate signal in turn can be used in the processing circuit 24, defined previously as the third portion of the invention, to selectively modify an anti-copy protection (ACP) signal embedded in a video signal, such as the copy protected video signal depicted at input 28, to provide a modified ACP signal on output 29. It is readily apparent that the vertical rate signal generated by the circuitry 22 and 26 may be used in any other type of user apparatus which requires a vertical rate signal, and is not limited to use with the ACP processing circuit 24 depicted herein by way of example only.

FIG. 3 illustrates two different circuits for generating a reliable vertical rate signal in accordance with the invention by sensing the period, or spacing, between positive or negative transitions from one sync pulse to another for an approximate 32 microsecond ($\mu$s) spacing in the VBI. The 32 $\mu$s spacings occur in the vertical sync signal such as in the pre-equalizing pulse interval, the vertical sync pulse interval or in the post equalizing pulse interval. See, the sample #1 in FIGS. 1 and 1A. To this end, in one embodiment, a video sync signal such as a composite sync signal, is supplied on an input 38 to a spacing detector 40 which detects pulse transition spacings of about 32 $\mu$s±20%, wherein the transitions are positive or negative. Thus, the spacing detector 40 provides a reliable vertical rate signal 42 via an output 42.

In another embodiment of FIG. 3, the video sync signal on input 38 is supplied to a frequency sensing circuit 44 which senses for a frequency component corresponding to about a 32 $\mu$s period. See again the example #1 in FIGS. 1 and 1B. In FIG. 3, the video's sync pulses are primarily at a frequency of about 15.734 kilohertz (kHz). But in the VBI, there are some 31.5 kHz frequency components due to the 32 $\mu$s spacing of edges from vertical sync signals such as equalizing pulses or serrated vertical sync pulses. The sensing circuit 44 thus includes (an optional) one-shot 46 of 16 $\mu$s coupled to a bandpass filter 48, or equivalent, to provide a peaked response. The output of bandpass filter 48 is supplied to a threshold detector 50 which provides a reliable vertical rate signal 52 on an output 52 when 32 $\mu$s period pulses are present. The bandpass filter 48 may have a range of 20 kHz to 45 kHz, for example. As indicated, the vertical rate signals 42 and 52 of FIG. 3 may not be the same depending upon in which portion of the VBI they are detected.

Figure 4:
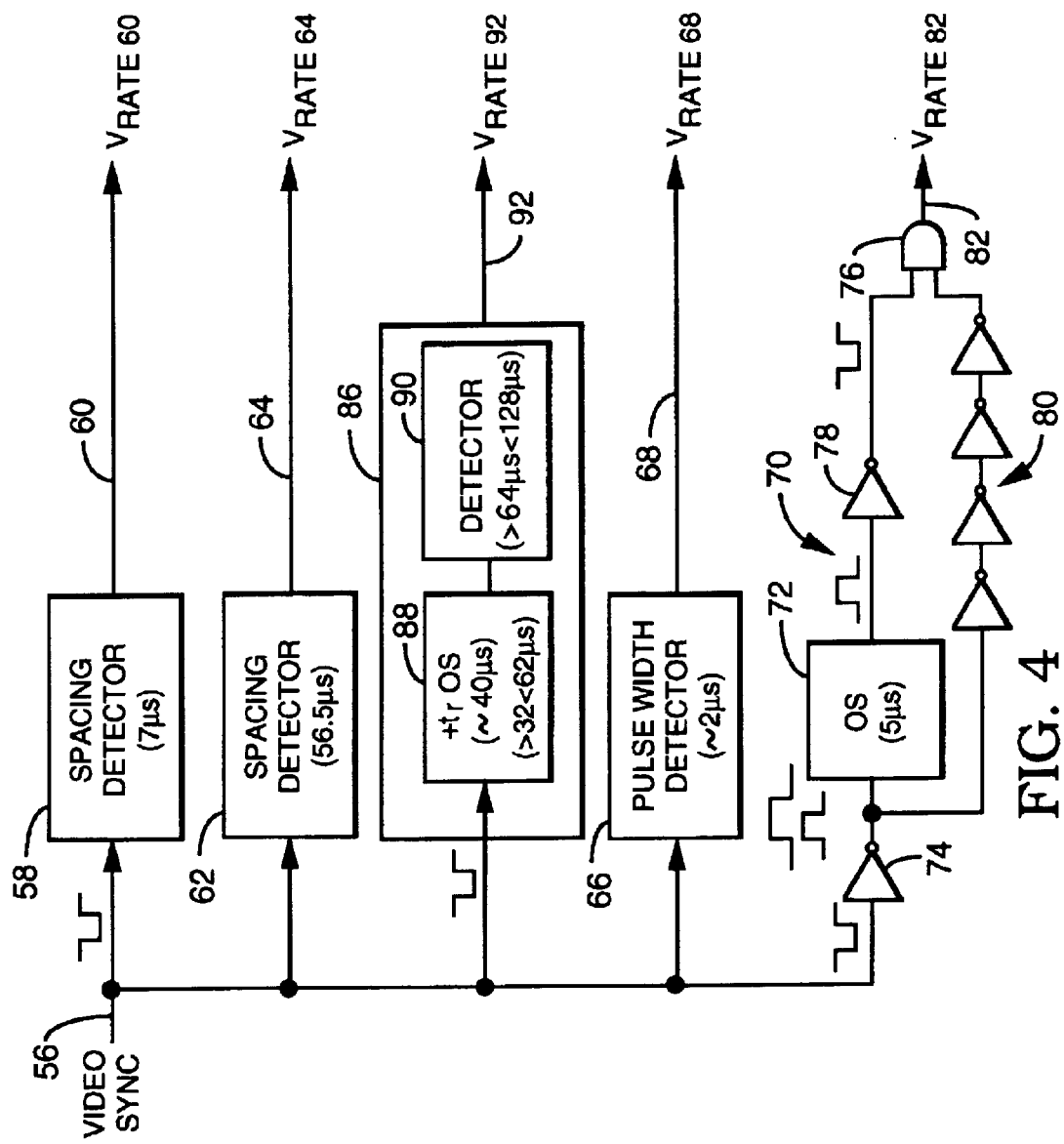
FIG. 4 is a block diagram illustrating several embodiments of the invention which sense pulse intervals of 7 $\mu$s, about 56.5 $\mu$s and 88 $\mu$s, and/or sense pulse widths of about 2 $\mu$s, and/or greater than 5 $\mu$s.

FIG. 4 illustrates several other embodiments of the invention for generating a vertical rate signal by sensing other specific edge transition spacings and/or pulse widths. In one embodiment, a video sync signal on an input 56 is supplied to a spacing detector 58 which senses for a 7 $\mu$s spacing between leading edge transitions in video lines 6–7 and/or 269. See the example #2 in FIG. 1. Detector 58 provides a reliable vertical rate signal 60 on an output 60 upon sensing the 7 $\mu$s spacing.

In another embodiment, the video sync signal is supplied to a spacing detector 62 which senses for about a 56.5 $\mu$s spacing between trailing edge transitions in video lines 3–4 and/or 266. See the example #5 in FIGS. 1 and 1B. Detector 62 then provides a reliable vertical rate signal 64 on an output 64 upon sensing the 56.5 $\mu$s spacing.

In a further embodiment of FIG. 4, a pulse width detector 66 is coupled to the video sync signal via the input 56 and detects an approximately 2 $\mu$s pulse width, such as that of an equalizing pulse, and provides a reliable vertical rate signal 68 on an output 68 in response thereto. See example #3 in FIG. 1. The detector 66 can also receive inverted sync pulse polarities and then sense for a 4.7 $\mu$s pulse width of a vertical serration signal, such as illustrated in FIG. 1B by an example #3A.

Another embodiment illustrated in FIG. 4 includes pulse detector circuit 70 formed of a one-shot 72 which receives an inverted video sync signal via the input 56 and an inverter 74. The one-shot 72 is coupled to an AND gate 76 via an inverter 78, and the second input to AND gate 76 is a time delayed signal from the inverter 74 via a delay circuit 80. The pulse detector circuit 70 generates a horizontal sync pulse with a width which is longer than normal, for example, which is at least 5 $\mu$s, to thereby gate out the first 5 $\mu$s of any sync pulse. It follows that all pulses such as equalizing pulses (of about 2 $\mu$s), and normal horizontal sync pulses (of 4.7 $\mu$s), will not produce an output from the AND gate 76. Only pulses longer than 5 $\mu$s such as vertical sync pulses will produce a reliable vertical rate signal 82 via the AND gate 76 on an output 82. See the example #4 in FIG. 1.

The last embodiment of the invention illustrated in FIG. 4 comprises an "incorrect" (i.e. inept) twice horizontal rate (2H) eliminator circuit 86. That is, the trailing edge of the video sync signal pulse is used to trigger a timing circuit formed of a one-shot 88 whose period is greater than a one-half of a horizontal line period, for example, 40 $\mu$s. The output of one-shot 88 is supplied to a detector 90 which senses a period of about 88 $\mu$s and triggers off the leading edges of the pulses from the one-shot. See the example #6 in FIG. 1. It is noted that a "correct" 2H eliminator circuit triggers off a leading edge of pulses rather than the trailing edge as does the "incorrect" eliminator circuit 86, with a greater than one-half line period timing circuit, and thus produces a horizontal rate signal. The incorrect 2H eliminator circuit 86 provides a reliable vertical rate signal 92 on an output 92 in accordance with the invention. As previously mentioned, the circuits of FIG. 4 alternatively can output reliable frame rate signals instead of vertical rate signals.

The incorrect 2H eliminator circuit 86 also can generate a reliable vertical (or frame) rate signal by sensing pulse periods other than the 88 $\mu$s periods. For example, the circuit 86 can also detect a period of about 71 $\mu$s which occurs in the post equalization pulse interval which immediately follows the vertical sync pulse interval, in the VBI in selected lines in a field, and is an indication of the VBI occurrence. Alternatively, the circuit 86 can detect a period of about 96 $\mu$s which occurs in the last portion of the post equalization pulse interval in the VBI of selected lines in a field, to provide a reliable vertical rate signal in accordance with the invention. In each of these examples, the incorrect 2H eliminator circuit 86 triggers off the trailing edge of the video sync signal, and the one-shot 88 has an interval of greater than one horizontal line (for example 64 $\mu$s) but less than two horizontal lines (for example 128 $\mu$s).

Although the VBI location technique of the invention is described herein in terms of an NTSC color television standard, it is equally applicable to other standards such as PAL, etc.

Figure 5:
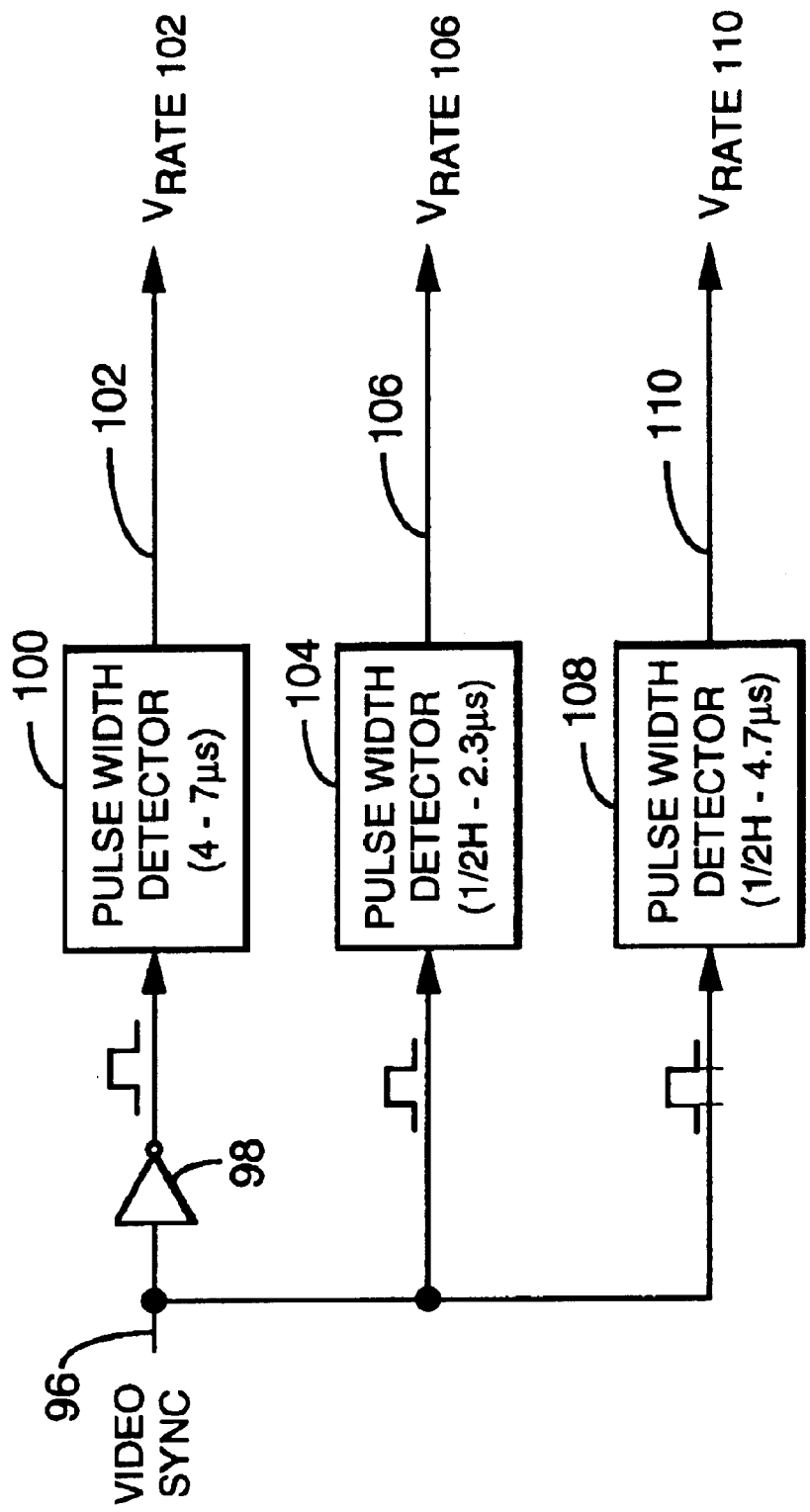
FIG. 5 is a block diagram illustrating still other embodiments of the invention which sense pulse widths of various selected durations to derive the reliable vertical rate signal.

FIG. 5 illustrates still further embodiments of the invention for sensing and generating a reliable vertical (or frame) rate signal via unconventional means involving the particular characteristics of the VBI signals. In one embodiment a video sync signal is supplied via an input 96 and an inverter 98 to a pulse width detector 100 which measures the width of the positive going H sync pulses within the broad vertical sync pulses. The positive going H sync pulses are about 4.7 $\mu$s and are measured for example via an inverted H sync signal. A reliable vertical rate signal 102 is provided on an output 102. See example #3A in FIG. 1B.

In another embodiment of FIG. 5, a vertical rate signal is provided on an output 106 via a pulse width detector 104 which measures the width of a signal for a duration of about ½H–2.3 $\mu$s where H is a horizontal line period. See example

3B in FIG. 1B. This duration is found for example in horizontal lines 266 and/or 3–4, as may be seen in FIG. 1.

A further embodiment includes a pulse width detector 108 which measures the width of a vertical sync pulse, about ½H–4.7 μs, and provides a reliable vertical rate signal 110 on output 110. See example #3C in FIG. 1B.

Figure 6:
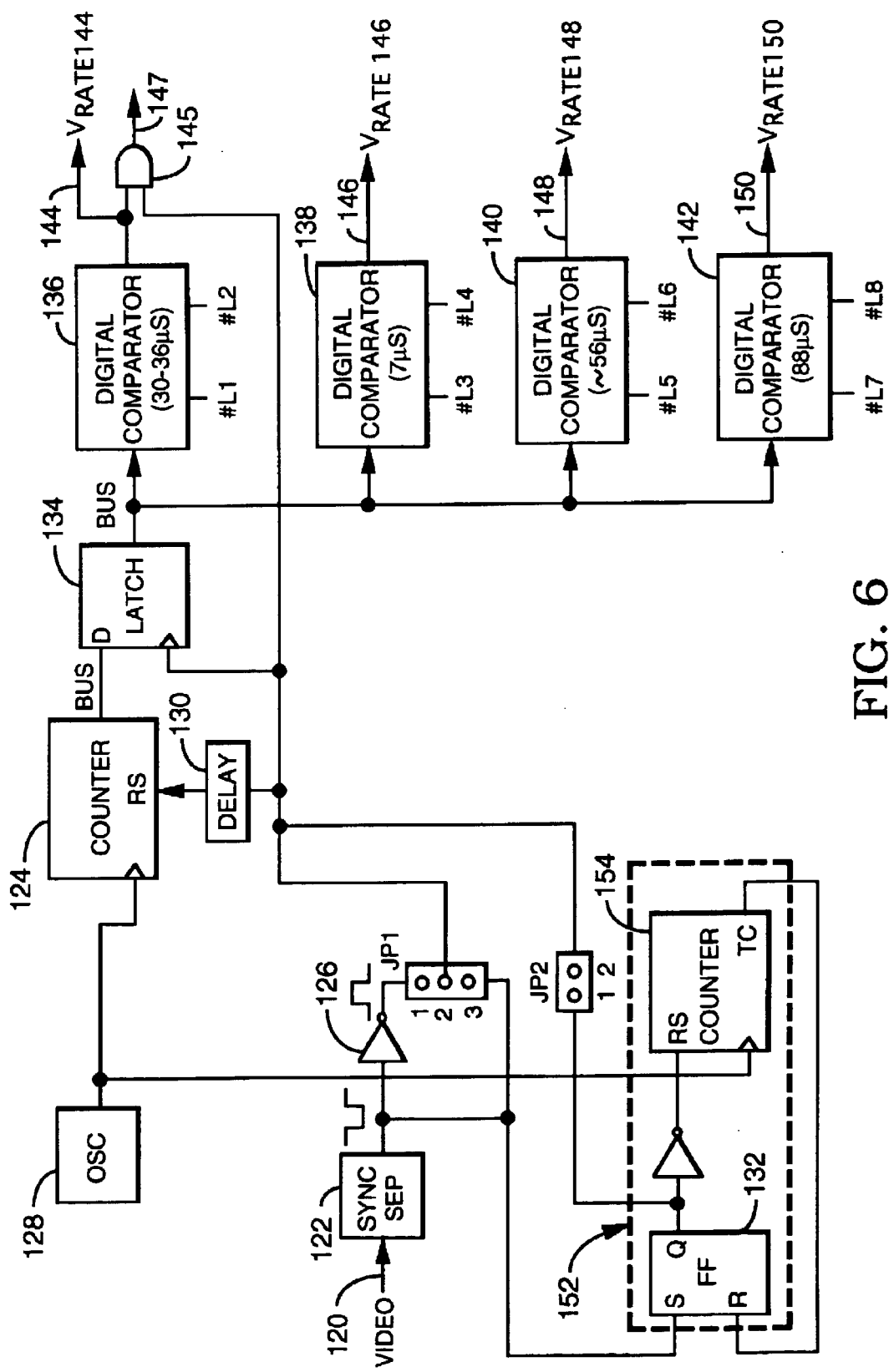
FIG. 6 is a block diagram illustrating in further detail several of the embodiments of the invention previously depicted for example in FIGS. 3, 4 and 5.

FIG. 6 illustrates in further detail some of the various embodiments of the invention of previous description in FIGS. 3–5. A video signal is supplied via an input 120 to a sync separator circuit 122, whose output is supplied to a counter 124 via an inverter 126, contacts 2, 3 of a jumper JP1 and a delay circuit 130. Sync separator 122 output also is supplied to contact 1 of the JP1 and to the input of a flip flop 132. The signal to counter 124 resets it on the leading edge of the sync pulses. At this time the contacts 1, 2 of the jumper JP2 coupled to flip flop 132 are open. Counter 124 is clocked by an oscillator circuit 128 and thus counts up to a selected number of clocks before being reset to zero on the leading edge of the next sync pulse. Before counter 124 is edge reset to zero, the final count therein is transferred to a memory latch 134. The final counts are indicative of the period between successive leading edge transitions of the sync signal. The output from the latch 134 is then supplied to digital comparators 136, 138, 140 and 142, which provide high logic state signals (i.e., V rate signals 144, 146, 148, 150) on respective outputs 144, 146, 148 and 150 based on a range of numbers set by respective threshold inputs L1–L2, L3–L4, L5–L6 and L7–L8.

By way of example, if the clock from oscillator circuit 128 is running at a 1 μs rate, the latch 134 will output numbers of 64, 32, 56 and 7, as well as any other desired numbers. The digital comparator 136 may have its threshold inputs L1, L2 set for numbers 30 and 36 respectively, whereupon a count of from 30 to 36 inclusive from latch 134 would provide a high logic state on the output 144. An AND gate 145 is coupled to the output 144 and also to the contact 2 of JP1, and provides a gated signal indicative of occurrences of a 32 μs period on an output 147.

Similarly, the digital comparator 138 may have set limits on inputs L3, L4 for numbers from 5 to 9 so that a count of for example 7 would provide a high logic state on the respective output 146. The digital comparator 140 may have set limits of from 54 to 59 whereby a count of 56 or 57 causes a high logic state on the output 148. It may be seen accordingly that the digital comparators 136–140 comprise detection circuits for the 32 μs, the 7 μs and the 56 μs periods between successive sync edges, which periods conform to the examples described previously in relation to the FIGS. 3, 4, 5 and illustrated for example in FIG. 1.

In the situation where jumper JP1 is not connected to any contact and jumper JP2 is loaded, an "incorrect" 2H eliminator circuit 152 is provided via the flip flop 132 and a counter 154. The flip flop 132 sets a high output at a trailing edge of sync. The counter 154 counts for over one-half of a video line's period (that is, 40 μs or a count of 40 for a 1 μs clock from oscillator circuit 128) before resetting the flip flop 132 and then also resetting itself. The output from the flip flop 132 is a pulse of a width of greater than one-half of a line's period and is supplied to the counter 124, the latch 134 and to the digital comparator 142. The latter also detects the spacing between edges of successive pulses as do the comparators 136–140. The output of the flip flop 132 is usually about 64 μs but an 88 μs spacing does occur at a vertical or frame frequency rate, once per VBI. Therefore the flip flop 132 provides numbers of 64 and 88 assuming that oscillator circuit 128 is running at a 1 μperiod. The digital comparator 142 is set at limits of 86 to 90 counts via the inputs L7 and L8 and thus provides a logic high state on the output 150 whenever an 88 μs spacing occurs. See the example #6 in FIG. 1.

FIG. 6A illustrates an alternative embodiment of an adjunct circuit which may for example receive the signals on the outputs 144, 147 of FIG. 6, and which provides on an output 160 a high logic state when a minimum number of pulses of a particular spacing occurs. An inverter 162 supplies the signal on input 144 to a counter 164, wherein the latter is clocked via the gated signal on input 147. The counter 164 counts for example the number of times the 32 μs spacings occur before being reset to zero, and supplies a resulting output to a digital comparator 166. The latter has a set limit supplied via an input L9 of for example greater than 2, 5, etc., pulses of 32 counts or 32 μs, whereupon it outputs a high logic state corresponding to the reliable vertical rate signal via the output 160.

The circuit of FIG. 6A is useful in certain noisy conditions where a vertical rate pulse is generated only after a particular number of pulses of the proper spacing, period or width is produced.

FIG. 7 illustrates an embodiment of the invention for measuring the pulse width of a positive going pulse. To this end, a positive going pulse is supplied via an input 168 to a delay circuit 172 via an inverter 170, which also supplies the clock input of a latch 174. The output of the delay 172 allows a counter 176 to count clocks supplied to its clock input for the duration of the positive going pulse. Before the final count is reset, latch 174 stores the last number in the counter 176. Thus the delay 172 allows the latch 174 to store the last count prior to the reset of the counter 176. The output of the latch 174 provides numbers corresponding to the pulse width of the positive going pulse. For example, if the clock to counter 176 has a period of 0.1 μs, then a 2.3 μs wide positive going pulse will cause a number 23 to output from the latch 174. A digital comparator 178 then receives the number(s) provided by the latch 174 and produces a logic high state on an output 180 for numbers that fall within the range of numbers, that is, limits, set at inputs L10 and L11 to the comparator 178. For example, L10 may be set at 20 and L11 may be set at 26.

As described above, the FIGS. 3–7 are concerned with the first portion of the invention of previous mention. The following FIGS. 8–11 and 11A are concerned with the second portion of the invention, also previously mentioned, which includes means for preventing the successful generation of a reliable vertical rate signal, such as when using the unconventional techniques of the first portion of the invention which derives a vertical rate signal utilizing the particular characteristic signals in the VBI.

To this end, FIG. 8 illustrates basic circuitry of the previously mentioned second portion of the invention, wherein the VBI of a video signal or of an ACP video signal is selectively modified to prevent the use of the unconventional techniques of deriving the vertical rate signal such as those described herein with respect to the first portion of the invention of FIG. 2 and FIGS. 3–7. In FIG. 8, a video signal or ACP video signal is supplied via an input 181 to a timing circuit 182 similar to the timing circuit 22 of FIG. 2, and also to a (third) signal processing circuit 184. The timing signal from circuit 182 is supplied to the signal processing circuit 184 which in turn selectively modifies, attenuates, adds to and/or inserts into the VBI selected signals which will prevent a circuit such as processing circuit 26 of FIG. 2 from generating a correct or reliable vertical rate signal. Such selected signals are illustrated by way of example in FIG. 10. Thus, circuit 184 outputs an "incorrect" or unreliable vertical rate signal on an output 185.

Figure 9:
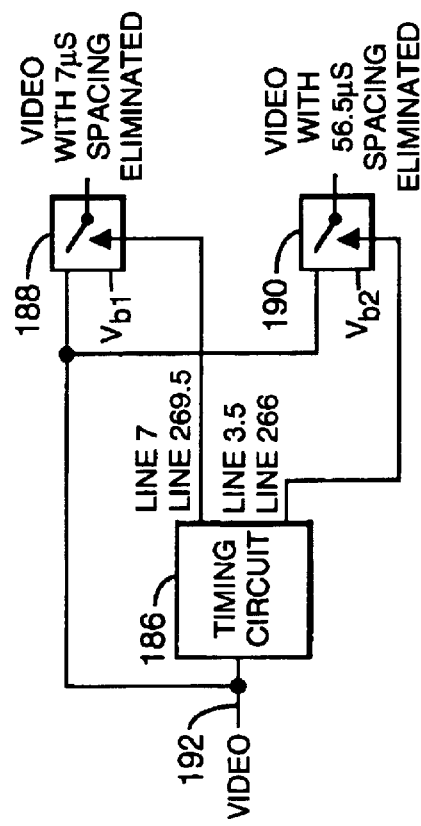
FIG. 9 is a block diagram illustrating embodiments of the basic configuration of FIG. 8 for defeating, that is, preventing, the generation of correct or reliable vertical rate signals.

FIG. 9 illustrates circuitry of an embodiment of the invention which prevents the generation of a reliable vertical rate signal such as provided for example by the techniques described above with respect to FIGS. 3–7. In FIG. 9, a video signal is supplied to a timing circuit 186 and to one input of first and second switches 188, 190 via an input 192. The second inputs of the switches 188 and 190 are supplied with selected voltages $V_{b1}$ and $V_{b2}$, respectively. The timing circuit 186 supplies a first signal which identifies the locations of lines 6-7 and 269 and is used to control the switch 188 to modify the video sync pulses so that a 7 μs spacing is substantially eliminated at selected times. Thus the technique disclosed above, wherein a reliable vertical rate signal is generated by detecting a 7 μs pulse in the VBI, is defeated.

The timing circuit 186 supplies a second signal which identifies the locations of video lines 3.5 and 266 and is used to control the switch 190 to modify the video sync pulses so that a 56.5 μs spacing is substantially eliminated at selected times. This defeats the technique of previous description which senses the 56.5 μs is spacing to generate a reliable vertical rate signal.

Other embodiments may be applied to substantially eliminate or selectively modify the various edge spacings and/or pulse widths to prevent their being detected to generate a reliable vertical rate signal. For example, the V sync pulse may be sufficiently shortened or lengthened on lines 6–7 and 269 to substantially eliminate its detection, for example, for a 7 μs spacing (example #2, FIG. 1).

Figure 10:
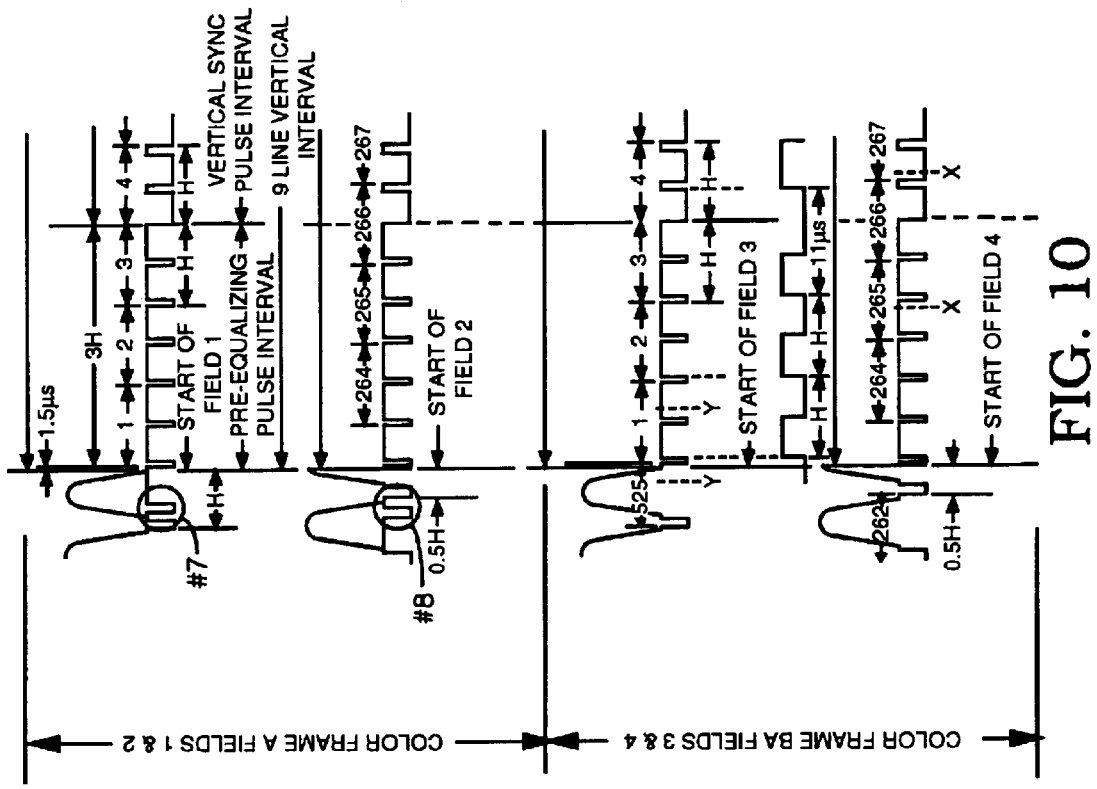
FIG. 10 is a partial diagram of the waveforms in the VBI illustrating the addition of selected pulses in different locations of the video signal depicted in for example FIG. 1, to prevent the generation of a reliable vertical rate pulse.

FIG. 10 illustrates by way of example, the insertion of specific signals in different locations in the video signal such that these signals, for example of about 7 μs, about 56.5 μs and/or about 32 μs periods similar to sync pulses, are inserted such as in locations in or near the end or beginning of the active video field. For instance, another example would be the modification of a signal near the beginning and/or end of the vertical sync signal area. (The vertical sync signal includes pre and post equalizing and broad sync pulse intervals). See the examples #7 and #8 in FIG. 10. Signals such as these may be inserted into the video signal using circuits such as those illustrated in FIG. 9.

FIG. 11 illustrates a further embodiment for modifying a video signal or an anti-copy protection (ACP) video signal so as to cause unconventional vertical rate generator or detection circuits to fail, to behave inconsistently, or to generate vertical rate signals at the wrong time(s). In FIG. 11, a video signal is supplied via an input 198 to a sync separator circuit 200 that supplies H sync and frame signals to a timing circuit 202. The outputs of timing circuit 202 are line and pixel location signals which are then coupled to a modifier circuit 204 which also has the input video signal coupled to it. Modifier circuit 204 causes the modification of a portion or portions of the video signal by selected processes such as by deleting, inserting, attenuating, narrowing, widening, width modulating, amplitude modulating, position modulating, and/or level shifting processes. One such modifying circuit can be a signal inserting circuit for substituting different level signals for normal blanking, sync tip, etc., level signals.

By way of example, various processes for the modifications of previous mention include:

1) Modifying any combination of equalizing pulses or half line pulses. For example, modifying any combination of half line pulses in the vertical sync signal (i.e., lines 1–9 and/or lines 263 to 271 inclusive of FIG. 1). This would cause the 32 μs detector (viz, circuits 40, 44 in FIG. 3) to output an unreliable vertical rate signal.

2) Modifying the positive going pulse at the end of line 6 and/or at the middle of line 269 so a circuit such as circuit 58, a 7 μs spacing detector in FIG. 4, produces an unreliable vertical rate signal.

3) Modifying the negative going pulse at the beginning of line 7 and/or in the middle of line 269, so a circuit such as circuit 58, a 7 μs is spacing detector in FIG. 4, produces an unreliable output.

4) Modifying any combinations of the pre and/or post equalization pulses so as to cause a circuit such as 7 μs spacing detector 58 in FIG. 4, to produce an unreliable output.

5) Modifying any combination of the negative going pulse at the beginning of line 266 and/or middle of line 3 so a circuit such as 56.5 μs spacing detector 62 in FIG. 4, produces an unreliable output.

6) Modifying any combination of the positive going pulses at the middle of line 4 and/or at the end of line 266 so a circuit such as circuit 86 in FIG. 4, comprising an incorrect 2H eliminator circuit and an 88 μs spacing detector, produces an unreliable output.

7) Modifying the video signal by selectively adding or inserting either positive and/or negative going pulses. For example, adding or inserting at least one negative going pulse in the location of the pre or post equalizing pulses will cause a 32 μs spacing detector such as those in FIG. 3 to not work properly or reliably. In another example, adding or inserting at least one positive going pulse in the region of line 6, preferably close to the positive going pulse at the end of line 6, can cause a 7 μs detector such as the spacing detector 58, FIG. 4, to perform unreliably. In yet another example, adding or inserting a negative going pulse during the first half line of line 266, or near the end of line 3, can cause a 56.5 μs spacing detector, such as the detector 62 of FIG. 4, to not work reliably.

8) Furthermore it is possible to add or insert negative going pulses, modulated or not, in the area outside the VBI to cause the 32 μs, 7 μs, 56.5 μs, and/or 88 μs detectors of previous example to output a vertical rate pulse with the wrong timing, i.e., early and/or late.

9) It is also possible to narrow certain horizontal sync pulses to the duration of equalizing pulses to cause a 2 or 2.3 μs width detector to output a signal early and/or late.

10) It is also possible to add or insert negative going pulses of the duration of an H sync pulse in the pre and/or post equalizing pulse locations, to form at least one positive going pulse of about 4.7 μs in these locations so that a 4.7 μs detector will output a signal early and/or late.

11) Modifying at least one equalizing pulse, such as the pulses labeled "Z" in FIG. 1, such as by attenuating, narrowing or blanking processes. Alternatively, at least one serration pulse "Z1," FIG. 1, may be modified in similar manner. One example is to remove all Z pulses.

12) It is also possible to provide the modification process by employing any combination of the possibilities 1–11 above.

FIG. 11A illustrates in further detail an embodiment of the modifier circuit 204 for modifying a video signal to cause the various detectors and/or vertical rate generators of for example previous mention, to output an unreliable vertical rate signal. FIG. 11A illustrates in particular a process for the insertion of signals. Input video is coupled to a switch 206 via an input 208. The switch 206 is controlled by an AND gate 210 which is logic high for selected portions of a video signal so as to allow the switch 206 to insert either negative and/or positive going pulses into the video signal. When a voltage source Vb(t) applied to a second input of the switch 206 is below normal blanking level, negative going pulses are inserted and/or existing negative going pulses are widened. Alternatively, when Vb(t) is at about normal blanking level, existing negative going pulses are at least narrowed and/or positive going pulses are inserted. In either situation, the video signal with modified sync pulses is output via an amplifier 212 and an output 214.

FIG. 12 illustrates another embodiment of the invention corresponding to the third portion of the invention of previous mention, in which the unconventionally derived reliable vertical rate signals of the first portion of the invention are utilized to selectively modify the video signal. To this end, FIG. 12 utilizes a reliable vertical rate signal (VID) generated by such methods as illustrated in circuits 42, 44, 58, 62, 66, 70, 86, 100, 104 and/or 108. Signal VID is coupled via an input 216 to a timing generator circuit 218 which generates a timing signal in at least a portion of the VBI duration, which is supplied to an AND gate 220. The VID signal also is applied to time a counter 222 which is clocked by an oscillator circuit 224 to generate pulses substantially close to the horizontal sync phase and frequency of a video signal being supplied via an input 226 to a blanking circuit 228. A timing generator 230 is used to generate pulses that are within the HBI vicinity of the incoming video signal. Typically the pulse duration of the output of the generator 230 is in the range of 1 $\mu$s to 10 $\mu$s, with 4.7 $\mu$s as one example. The output of the generator 218 is also used to blank or to replace some portion of the VBI via the blanking circuit 228. A combining circuit 232 is coupled at a negative input to the AND gate 220 and at a positive input to the blanking circuit 228, and is used to add back at least some regenerated sync pulses supplied by the timing generator 230. Thus an output 234 of the combining circuit 232 is a signal with substantially the same video signal outside the VBI vicinity but with some portions of the VBI modified, attenuated, or removed so as to alter the effects of an anti-copy protection signal (that is, the effects in a TV set and/or a VCR).

Although the invention has been described herein relative to specific embodiments, various additional features and advantages will be apparent from the description and drawings, and thus the scope of the invention is defined by the following claims and their equivalents.

What is claimed is:

1. A method of identifying a vertical blanking interval (VBI) in a video signal, the VBI including video horizontal lines and horizontal sync (H sync) signals, comprising the steps of:
    sensing a time interval which occurs in accordance with particular characteristics of signals in the VBI, which time interval occurs in at least one selected video line in the VBI; and
    generating a vertical/frame rate signal in a desired location in the VBI in response to the sensed time interval, wherein the vertical/frame rate signal reliably indicates the presence of the VBI.

2. The method of claim 1 wherein the time interval occurs between selected edges of pulses which occur in pre-equalizing, post-equalizing or vertical sync pulse intervals of the VBI in the selected video lines.

3. The method of claim 1 wherein the step of generating includes:
    producing a timing signal indicative of the desired location; and
    regenerating a reliable vertical/frame rate signal at the desired location in response to the timing signal.

4. The method of claim 1 wherein the step of sensing includes sensing the time interval between sync pulses within the VBI and detecting when the time interval between sync signals is about 32 microseconds ($\mu$s) rather than the normal 64 microseconds, which only occurs in the VBI.

5. The method of claim 4 wherein the step of sensing includes supplying the video signal to means for detecting a spacing of 32 $\mu$s ±20%.

6. The method of claim 4 wherein the step of sensing includes sensing for a frequency component corresponding to about a 32 $\mu$s period caused by the 32 $\mu$s spacing of edges from equalizing pulses and/or serrated vertical sync pulses of the VBI.

7. The method of claim 1 wherein the step of sensing includes sensing a time interval of about 7 $\mu$s between selected leading edge transitions which occur in at least one video line in the VBI.

8. The method of claim 1 wherein the step of sensing includes measuring the pulse widths of sync signals which are less than 4.7 microseconds and which occur in the VBI.

9. The method of claim 1 wherein the step of sensing includes triggering off the leading edge of sync to generate a pulse greater than 4.7 microseconds ($\mu$s) but less than about 27 $\mu$s to allow the output of broad vertical pulses while gating out H sync signals which are greater than 27 $\mu$s duration.

10. The method of claim 1 wherein the step of sensing includes measuring the spacing between selected edge transitions of two pulses and sensing for a spacing of about 56.5 microseconds which occurs in at least one selected line in the VBI.

11. The method of claim 1 wherein the step of sensing includes triggering off the trailing edge of H sync for a pulse duration of greater than one-half a video line duration and sensing for a spacing of greater than one horizontal line but less than two horizontal lines in selected lines in the VBI.

12. The method of claim 11 wherein the step of sensing includes generating a timing signal whose period is greater than the one-half line duration; and
    detecting a period greater than 64 microseconds ($\mu$s) but less than 128 $\mu$s in response to the timing signal.

13. The method of claim 12 wherein the period is about 88 $\mu$s.

14. The method of claim 12 wherein the period is about 71 $\mu$s.

15. The method of claim 12 wherein the period is about 96 $\mu$s.

16. The method of claim 11 including sensing for a spacing between selected edges on a selected video line of about 56.5 $\mu$s.

17. The method of claim 1 wherein the VBI includes pseudo sync pulses on selected video lines, and the step of sensing includes sensing the nominal spacing of less than 10 microseconds between the pseudo sync pulses.

18. The method of claim 1 wherein the video signal contains a copy protection signal, further comprising:
    modifying the copy protection signal in response to the generated vertical rate signal to attenuate or defeat the effects of the copy protection signal in the video signal.

19. The method claim 18 wherein the step of modifying includes:
    providing a pulse of selected duration in the VBI;
    providing regenerated sync pulses substantially similar to the phase and frequency of the normal H sync signal in the video signal;

blanking at least a portion of the VBI in response to the pulse of selected duration; and adding at least some of the regenerated sync pulses back into the blanked portion of the VBI to alter the copy protection signal accordingly.

20. The method of claim 19 wherein the regenerated sync pulses have a duration of about 1 microsecond to about 10 microseconds.

21. Apparatus for identifying a vertical blanking interval (VBI) in a video signal, the VBI including video horizontal lines and horizontal sync (H sync) signals, comprising:

a timing circuit receiving the video signal for providing a timing signal indicative of the sync signals in the video signal; and a processing circuit responsive to the timing signal for sensing a time interval which occurs in accordance with particular characteristics of signals in the VBI and for generating a vertical frame rate signal in response to the sensed time interval.

22. The apparatus of claim 21 wherein the time interval occurs over selected pulse widths or between selected edges of pulses which occur in the VBI and wherein said processing circuit includes means for generating a vertical/frame rate signal at a desired location in the VBI in response to the sensing of the selected pulse widths and/or pulse edge spacings, the vertical/frame rate signal being indicative of the VBI presence.

23. The apparatus of claim 22 wherein the means for generating includes a timing generator circuit for producing a second timing signal for regenerating a reliable vertical/frame rate signal at the desired location in the VBI, which allows a selective modification of the video signal.

24. The apparatus of claim 21 wherein the timing circuit includes a sync separator circuit.

25. The apparatus of claim 21 wherein the processing circuit comprises:

a spacing detector for sensing a period of 32 microseconds±20% between pulse transition spacings; and means responsive to the spacing detector for generating the vertical/frame rate signal.

26. The apparatus of claim 21 wherein the processing circuit comprises:

a frequency sensing circuit receiving the video signal for sensing a frequency component corresponding to about a 32 microsecond ($\mu$s) period caused by the 32 $\mu$s spacing of edge transitions of equalizing pulses and/or serrated vertical sync pulses in the VBI.

27. The apparatus of claim 26 including:

a one-shot circuit of about a 16 $\mu$s period;

a bandpass filter of 20 to 45 kHz coupled to the one-shot circuit; and a threshold detector circuit coupled to the bandpass filter.

28. The apparatus of claim 21 wherein the processing circuit comprises:

a spacing detector for sensing for 7 microsecond spacings between selected edge transitions in at least one selected video line in the VBI; and means responsive to the spacing detector for generating the vertical/frame rate signal.

29. The apparatus of claim 21 wherein the processing circuit comprises:

a spacing detector for sensing for about 56.5 microseconds spacing between selected edge transitions which occurs in the VBI; and means responsive to the spacing detector for generating the vertical/frame rate signal.

30. The apparatus of claim 21 wherein the processing circuit comprises:

a pulse width detector for sensing about a 2 microsecond ($\mu$s) pulse width; and means responsive to the pulse width detector for generating the vertical/frame rate signal.

31. The apparatus of claim 30 wherein the pulse width detector receives inverted sync pulses and senses for a 4.7 $\mu$s pulse width.

32. The apparatus of claim 21 wherein the processing circuit comprises:

a timing circuit which triggers on the trailing edge of the video sync signal and whose period is greater than one-half of a video line;

a detector circuit responsive to the timing circuit for sensing a period of greater than one horizontal line but less than 2 horizontal lines; and means responsive to the detector circuit for generating the vertical/frame rate signal.

33. The apparatus of claim 32 wherein the detector circuit is responsive to leading edge transitions from the timing circuit and the period sensed comprises about 71, 88, or 96 microseconds.

34. The apparatus of claim 21 wherein the processing circuit includes an inverter circuit, and a pulse width detector responsive to the inverter circuit for sensing for a 4.7 microsecond pulse period.

35. The apparatus of claim 21 wherein the processing circuit includes a pulse width detector for sensing for a one-half horizontal line (½ H)–2.3 microseconds period in at least one selected video line in the VBI.

36. The apparatus of claim 21 wherein the processing circuit includes a pulse width detector for sensing for a period of one-half horizontal line (½ H)–4.7 microseconds.

37. The apparatus of claim 21 wherein the video signal comprises a normal video signal or a video signal containing a copy protection signal, further comprising:

a second processing circuit responsive to the generated reliable vertical/frame rate signal for selectively modifying the normal video signal or the copy protection signal.

38. The apparatus of claim 37 wherein the second processing circuit includes:

a second timing generator circuit for producing a pulse of selected duration in the VBI;

a counter/timing circuit for producing regenerated sync pulses substantially similar to the H sync signals;

a blanking circuit receiving the video signal for blanking at least a portion of the VBI in response to the pulse of selected duration; and a combining circuit for adding some of the regenerated sync pulses back into the blanked portion of the VBI to modify the normal video signal or the copy protection signal.

39. A method of preventing the generation of a reliable vertical/frame rate signal via unconventional techniques based on the particular characteristics and peculiarities of the signals in or near a vertical blanking interval (VBI) of a video signal which does or does not contain a copy protection signal, comprising the steps of:

providing a timing/location signal which identifies respective locations of selected portions of the VBI as well as selected video lines; and modifying various time intervals which occur in accordance with the particular characteristics and peculiarities of the signals in or near the VBI in response to the timing/location signal to cause their detection to generate an unreliable vertical/frame rate signal.

40. The method of claim 39 wherein:

the step of providing identifies the location of about 7 microseconds (μs) spacing in at least one selected video line in the VBI; and the step of modifying includes substantially attenuating, shortening, lengthening and/or otherwise eliminating the 7 μs spacing to effectively prevent its detection.

41. The method of claim 39 wherein:

the step of providing identifies the location of about a 56.5 microsecond (μs) spacing in at least one selected video line in the VBI; and the step of modifying includes substantially attenuating, shortening, lengthening and/or otherwise eliminating the 56.5 μs spacing to effectively prevent its detection.

42. The method of claim 39 wherein:

the step of providing identifies a location in or near the end of an active video field; and the step of modifying includes inserting selected signals similar to normal sync pulses into the location to prevent the generation of a reliable vertical/frame rate signal.

43. The method of claim 39 wherein:

the step of providing includes providing H sync and frame signals, wherein the timing/location signal provides line and pixel location signals in response to the H sync and frame signals; and the step of modifying includes attenuating, width varying, selectively modulating and/or level shifting one or more portion of the video signal in response to the line and pixel location signals.

44. The method of claim 39 wherein the VBI contains half line equalizing and vertical sync pulses, wherein the step of modifying includes modifying any combination of the equalizing pulses or half line pulses in the video lines in the vertical interval, which would cause a 32 microsecond (μs) detector to generate an unreliable vertical/frame rate signal.

45. The method of claim 44 wherein one or more negative or positive going pulse is added or inserted in a selected location in the equalizing pulses.

46. The method of claim 44 wherein one or more equalizing and/or vertical sync pulses are modified by attenuating, narrowing or removing them.

47. The method of claim 39 wherein the various pulse edges may be positive going or negative going.

48. The method of claim 39 wherein negative going pulses, modulated or not, are added or inserted in the video signal outside the VBI to cause detectors of the pulse edge spacings or widths to generate erroneously timed vertical/frame rate pulses.

49. Apparatus for preventing the generation of a reliable vertical/frame rate signal via unconventional techniques based on the particular characteristics and peculiarities of the signals in a vertical blanking interval (VBI) of a video signal which does or does not contain a copy protection signal, comprising:

a timing circuit receiving the video signal for providing a timing/location signal which identifies respective locations of selected portions of the VBI as well as selected video lines; and a processing circuit responsive to the timing/location signal for selectively modifying various time intervals which occur in accordance with the particular characteristics and peculiarities of the signals in the VBI, to prevent their detection and thus prevent the generation of a reliable vertical/frame rate signal.

50. The apparatus of claim 49 comprising:

a sync separator circuit receiving the video signal for producing H sync and frame signals;

said timing circuit being responsive to the H sync and frame signals for providing line and pixel location signals; and wherein the processing circuit comprises a modifier circuit for attenuating, width varying, selectively modulating and/or level shifting a portion of the video signal in response to the line and pixel location signals.

51. The apparatus of claim 49 wherein:

the timing circuit includes an AND gate receiving line and pixel location signals for providing a timing/location signal indicative of selected portions of the video signal; and the processing circuit includes switch means receiving the video signal and a selected voltage signal and responsive to the timing signal for applying the selected voltage signal to the video signal in the selected portions.

52. The apparatus of claim 51 wherein the selected voltage signal is either negative and/or positive going pulses, wherein negative going pulses are inserted and/or existing negative going pulses are widened when the selected voltage signal is below normal blanking level, and alternatively, existing negative going pulses are at least narrowed and/or positive going pulses are inserted when the selected voltage signal is at about normal blanking level.

* * * * *